United States Patent [19]

Neel et al.

[11] Patent Number: 4,554,268

[45] Date of Patent: Nov. 19, 1985

[54] PROCESS FOR THE PREPARATION OF MODIFIED REFRACTORY OXIDES

[75] Inventors: Emmanuel E. A. Neel; Jacques A. Levavasseur, both of Grand-Couronne, France; Donald Reinalda, Amsterdam, Netherlands

[73] Assignee: Shell Oil Company, Houston, Tex.

[21] Appl. No.: 650,745

[22] Filed: Sep. 17, 1984

[30] Foreign Application Priority Data

Oct. 14, 1983 [FR] France ................................ 83 16373

[51] Int. Cl.$^4$ ......................... B01J 21/04; B01J 21/08
[52] U.S. Cl. ..................................... 502/439; 502/164
[58] Field of Search ............... 502/164, 242, 250, 251, 502/263, 439, 202, 341, 349, 350

[56] References Cited

U.S. PATENT DOCUMENTS

| | | | |
|---|---|---|---|
| 3,501,416 | 3/1970 | Wald | 502/164 |
| 4,186,078 | 1/1980 | Itoh et al. | 208/27 |
| 4,206,079 | 6/1980 | Frame | 502/164 X |
| 4,320,029 | 3/1982 | Frame | 502/164 X |
| 4,428,819 | 1/1984 | Shu et al. | 208/46 |

Primary Examiner—W. J. Shine
Attorney, Agent, or Firm—Kimbley L. Muller

[57] ABSTRACT

A process is described for the preparation of modified refractory oxides by impregnating refractory oxides or mixtures thereof with at least one hydrocarbyl ammonium metallate and/or compounds comprising at least one hydrocarbyl ammonium moiety and at least one reactive metal moiety of Group 2a, 3a, 4a and/or 4b of the Periodic Table of Elements. The modified refractory oxides can be used as catalysts or catalyst supports in the catalytic conversion of hydrocarbons.

18 Claims, No Drawings

PROCESS FOR THE PREPARATION OF MODIFIED REFRACTORY OXIDES

BACKGROUND OF THE INVENTION

This invention relates to a process for the preparation of modified refractory oxides, to modified refractory oxides thus obtained and to their use as catalysts or catalyst supports in the catalytic conversion of hydrocarbons.

It is known to use refractory oxides which have been treated with metal compounds as catalysts or catalyst supports in processes for the hydroconversion of hydrocarbons.

It would be advantageous to influence the properties of refractory oxides (i.e., their specific surface area, acidity and pore volume) in order to obtain (improved) catalytic activity and selectivity at acceptable temperature levels in hydroconversion processes.

It has now surprisingly been found that impregnation of refractory oxides with one or more compounds comprising a hydrocarbyl ammonium moiety and a reactive metal moiety leads to modified refractory oxides with excellent properties.

SUMMARY OF THE INVENTION

The invention therefore relates to a process for the preparation of modified refractory oxides which comprises impregnating refractory oxides or mixtures thereof with at least one hydrocarbyl ammonium metallate and/or compounds comprising at least one hydrocarbyl ammonium moiety and at least one reactive metal moiety of Group 2a, 3a, 4a and/or 4b of the Periodic Table of the Elements. Reference is made to the "Handbook of Chemistry and Physics", 55th edition, CRC Press, Ohio, USA (1975) for the Periodic Table of the Elements.

DETAILED DESCRIPTION OF THE INVENTION

It appears that reactive metals present in refractory oxide particles modified according to the present process are bound to a rather large extent to the surface of the particles in mono- or multimolecular layers. This is quite distinct for ready catalyst particles obtained by using well-known stabilizing methods for silica sols which comprise the treatment of such sols with very small amounts of a solution of a metallate; such catalysts appear to have metals or metal moieties throughout the body of the particles.

Without wishing to be bound to any particular theory, it is thought that the presence of reactive metals on the surface of catalyst (support) particles has an influence on their acidity, while maintaining and possibly improving their surface area and/or pore volume. For refractory oxides such as silica, which apparently lack sufficient acidity for application as catalyst support in processes where catalysts with moderate acidity are preferred (e.g., hydrogenation of kerosenes), modification according to the process of the invention provides a marked improvement in catalytic performance of such refractory oxides.

Substantially non-crystalline refractory oxide particles which have a surface area of 100–600 m²/g are suitably used in the process according to the invention; preferred is a surface area of 200–500 m²/g.

Refractory oxides which can be suitably used in the present process comprise silica, alumina, magnesia, zirconia, titania, chromia, boria or mixtures thereof such as silica-alumina, silica-magnesia, alumina-magnesia and/or silica-zirconia. Preference is given to silica, in particular to silica with a pore volume of at least 0.5 ml/g from which excellent hydroconversion catalysts can be prepared.

Small amounts of water may be tolerated in the refractory oxides used as starting material in the present process. For instance, for silica-comprising particles this amount of water may be up to 12%w, calculated on total weight.

Modified refractory oxide particles prepared according to the process of the invention generally exhibit a good resistance against crushing which is advantageous when these particles are used in a catalyst bed which has a substantial height (which may be 15 m or more in an upright reactor) or when a second layer of catalyst particles is placed upon this catalyst bed. Generally the modified refractory oxide particles have a bulk crushing strength (BCS) of 1–4 Mpa and a side crushing strength (SCS) of more than 40 N; preferably the BCS is 1.5–3 MPa and the SCS is 50–200 N.

Catalyst beds are often covered at their inlet by materials which are inert to the reaction, in order to facilitate even distribution of the feedstock, that is, to prevent or reduce channelling through the catalyst bed(s). Because the inerts will occupy a substantial portion of the reaction zone, e.g., up to 15 or 20% or more of the reaction zone volume, their presence adds to the capital expenditure of a catalytic hydroconversion process both for the reactor(s) and for the costs of the inerts which do not contribute in any significant manner to the desired conversion of the feedstock.

The presence of layers of inert material can be avoided in hydroconversion reactors when the catalyst employed therein is also capable of distributing the feedstock over the catalyst bed(s). Catalysts containing modified refractory oxides prepared according to the process of the present invention, and in particular substantially spherical particles, are eminently suitable for this purpose.

The use of spherical particles, which moreover have a high abrasion strength, results not only in improved flow distribution of feedstock but also in a reduced pressure drop over the catalyst bed(s), compared with the use of modified particles of a different shape. The term "spherical" as used herein refers to particles having both a true rounded shape and those generally spheroidal particles which do not pass perfectly rounded configurations. Procedures for preparing these particles are known in the art.

For instance, silica spheres can be prepared by a method comprising the initial preparation of a silica hydrogel by mixing an aqueous solution of an alkalimetal silicate with an aqueous solution of an acid, converting the hydrosol obtained into droplet form and gelling the droplets in a liquid which is not miscible with water. Optionally, the hydrogel obtained is then converted into a xerogel by reducing the alkalimetal content of the spherical silica hydrogel particles, followed by drying and calcining.

Generally use is made of refractory oxides comprising particles of which the smallest size is of from 0.1–30 mm. Beds of refractory oxide catalyst particles of less than 0.1 mm tend to plug more readily and are less effective in distributing feed across the initial contact layer of catalyst than beds of larger particles, whereas the use of particles of which the smallest size is above 30 mm results in catalysts having significantly lower activity per volume unit. Preferably use is made of particles of which the smallest size is from 0.5-10 mm. When the particles used are spheres the term "smallest size" refers, of course, to their diameters. Otherwise, e.g., for dumb-bell shaped particles, this term refers to the smallest distance from one wall to an opposite wall of the particle.

Modification of refractory oxides can be suitably carried out either by impregnating the refractory oxides with a solution comprising hydrocarbyl ammonium metallate or with at least two solutions comprising, respectively, one or more metal compounds and a hydrocarbyl ammonium hydroxide. Preference is given to the use of a hydrocarbyl ammonium moiety comprising one or more alkyl-groups with 1-4 carbon atoms, most preferably a tetramethyl ammonium moiety.

Suitable reactive metal moieties comprise any moiety or moieties of Group IIA, IIIA, IVA and IVB such as magnesium, aluminum, titanium and zirconium, which can be used separately or in combinations. When use is made of silica-comprising refractory oxides, aluminum is the preferred reactive metal moiety which is very suitably applied by inpregnating the refractory oxide with a solution comprising tetramethyl ammonium aluminate. Other reactive metal moieties, such as zirconium and magnesium are preferably applied, like aluminum, to the refractory oxides by impregnation with a solution comprising the nitrate(s) of the reactive metal(s) and subsequently with a solution comprising at least one hydrocarbyl ammonium hydroxide, preferably in such manner that the weight ratio of hydrocarbyl ammonium hydroxide to the appropriate refractory oxide(s) is from 0.01 to 1, preferably from 0.1 to 0.5.

Whenever using a hydrocarbyl ammonium metallate, the amount thereof is calculated on basis of the equivalent amount of hydrocarbyl ammonium hydroxide.

Also metal alkoxides such as titanium alkoxide (in particular titanium (IV) ethoxide) can be suitably applied to incorporate a metal into the refractory oxide(s).

The impregnation of the refractory oxides may be carried out in one or more stages with one or more solutions by any method known in the art e.g., dipping, soaking ("wet") or "dry" impregnation, in which last method the volume of the impregnating solution used is about equal to the total pore volume of the refractory oxide particles to be impregnated. The impregnation treatment is suitably carried out at temperatures up to the boiling point of the solvent, preferably at temperatures of from 60°-90° C. using aqueous solutions.

The modified refractory oxides thus prepared suitably comprise 0.1-10%w, and preferably 1-7%w, of reactive metals, calculated as metal oxides and based on the total weight of the modified refractory oxides. It is thought that larger amounts of reactive metals could adversely affect the strength of the modified refractory oxide particles thus obtained.

The modified refractory oxides are suitably subjected to a heat treatment after the (final) impregnation step or, alternatively, after more than one or after each impregnation step. The heat treatments comprise drying, suitably at temperatures of from 50°-250° C., and/or calcining steps, the latter being suitably carried out in air under atmospheric pressure at temperatures of from 250°-1000° C. With a two-step impregnation process, using for instance metal nitrates in the first step, it is preferred to calcine the metal-impregnated refractory oxides firstly at temperatures of from 250°-400° C. for 1-24 hours before carrying out the second impregnation step with hydrocarbyl ammonium hydroxide. After the second impregnation step the modified refractory oxides are preferably subjected to a calcination treatment in air at temperatures of from 400°-800° C. for 1-24 hours, in order to achieve the desired catalytic activity of the refractory oxides.

One or more catalytically active metals or compounds thereof may be loaded on to the modified refractory oxides prepared in the above-described manner. Of particular interest are catalytic composites comprising one or more metals of the groups 6 b and/or 8 of the Periodic Table of the Elements, and/or compounds thereof, such as molybdenum, tungsten, chromium, iron, nickel, cobalt, platinum, palladium, ruthenium, rodium, osmium and iridium; the modified refractory oxides may be loaded with these metals or their compounds by means of any process for the preparation of catalysts known in the art, such as impregnation, ion-exchange or precipitation.

Thus, modified refractory oxides prepared in accordance with the process of this invention can be utilized advantageously as catalysts or components thereof in a variety of processes for the catalytic conversion of hydrocarbons, preferably in the presences of hydrogen. For instance, modified refractory oxides loaded with 0.1-2% by weight of one or more noble metals of Group 8, calculated on the weight of the modified refractory oxides, are very suitable for use in processes where bifunctional catalysts (i.e., catalysts wherein acidity and hydrogenation activity have been balanced carefully) are needed. An example of such a process is the (partial) dearomatization of kerosenes.

Sulfur-containing compounds may be present in amounts of up to 100 ppmw in the kerosenes, without causing unacceptable loss of hydrogenation activity, when using the above-described noble metal-containing catalysts. Also small amounts of nitrogen-containing compounds may be tolerated.

A preferred catalyst for the partial dearomatization of kerosenes comprises platinum and/or palladium incorporated in silica spheres which have been impregnated with tetramethyl ammonium aluminate.

Prior to their use in hydroconversion processes the catalysts are preferably activated by treatment with hydrogen at a temperature from 150° C. to 700° C., in particular for at least several hours at a temperature from 300° C. to 500° C. and at least atmospheric pressure.

A process is known for the hydroisomerization of petroleum waxes in the presence of catalysts comprising coated refractory oxides. The latter can readily be prepared according to the process of the present invention.

In general the reaction conditions applied in hydroconversion processes comprise a temperature from 100°-600° C., preferably 200°-400° C.; a pressure of from 1-300 bar, preferably 10-150 bar; a hydrogen feed rate from 50-2500 Nl/kg feed, preferably 100-1000 Nl/kg feed; a space velocity from 0.1-10 kg feed/l catalyst/hour, preferably 1-6 kg feed/l catalyst/hour. A reaction temperature exceeding 600° C. is less desirable as it might cause considerable shortening of the catalyst life by increased formation of carbonaceous deposits thereon.

The hydrogen to be employed in these catalytic conversion processes may be pure or in the form of hydrogen-containing gases. The gases employed should preferably contain more than 50% by volume of hydrogen. Very suitable are, for example, hydrogen-containing gases obtained in the catalytic reforming or steam-reforming of gasoline fractions, and mixtures of hydrogen and light hydrocarbons. Any excess of hydrogen-containing gas is advantageously recycled, possibly after the previous removal of undesired components therefrom.

The invention is illustrated by the following Examples.

EXAMPLE 1

Different refractory oxides were prepared as follows.

A Silica spheres with a diameter of 1.5-2 mm, a pore volume of 0.64 ml/g and a specific surface area of 257 m$^2$/g were pre-dried at 200° C. for 2 hours. An aluminum nitrate-containing solution was prepared by dissolving 71 g of Al (NO$_3$)$_3$ in 50 ml of water, and was subsequently used to impregnate 70 g of the pre-dried silica spheres for 1 hour at ambient temperature. After evaporation of water for 1 hour at 60° C., the impregnated silica spheres were dried in air for 2 hours at a temperature of 150° C. and were subsequently calcined in air at 500° C. for 2 hours.

B A quantity of 100 g of pre-dried silica spheres with a pore volume of 0.74 ml/g and a specific surface area of 294 m$^2$/g was impregnated with an aqueous solution of tetramethyl ammonium aluminate obtained by mixing an aqueous solution of 24 g of aluminum chloride with 388 ml of tetramethyl ammonium hydroxide (10%v) in a nitrogen atmosphere. The impregnation was carried out at a temperature of 70° C. for 2 hours in a nitrogen atmosphere and subsequently for a further 16 hours at ambient temperature. The resulting modified silica spheres were firstly dried at 100° C. for 1 hour, then at 200° C. for 3 hours and subsequently calcined in air at 600° C. for 3 hours. The calcined spheres obtained contained 5.1%w alumina, (based on the total weight of the spheres); the pore volume was 0.65 ml/g and the specific surface area 346 m$^2$/g. The modified silica-comprising spheres prepared in accordance with the invention thus show a significant increase in surface area, compared with the silica spheres used as starting material.

EXAMPLE 2

On basis of the refractory oxides of Example 1 a number of noble metal-containing catalysts was prepared.

Preparation of catalyst A'

A quantity of 78 g of treated silica spheres as prepared under A of Example 1 was impregnated with a solution of 1.22 g of platinum nitrate in 100 ml of water at ambient temperature for 30 minutes. After evaporation of water the product was dried at 150° C. and subsequently calcined in air at 500° C. for 2 hours. The resultant catalyst (A') contains 0.8% by weight of platinum, calculated on the weight of the modified silica spheres.

Preparation of catalyst B'

A quantity of 35 g of modified silica spheres as prepared under B of Example 1 was co-impregnated with 45 ml of an aqueous solution comprising 281 mg of H$_2$PtCl$_6$.6H$_2$O, 299 mg of PdCl$_2$ and 2.4 ml HCl (38%v), whereafter water was evaporated and the product was dried at 120° C. and subsequently calcined in air at 500° C. for 3 hours. The resultant catalyst (B') contains 0.31%w of platinum and 0.50%w of palladium, both calculated on the weight of the modified silica spheres as prepared under B of Example 1.

Preparation of catalyst C'

A quantity of 35 g of silica spheres used as starting material under B of Example 1 was impregnated in the same manner as catalyst (B'). The resultant catalyst (C') contains 0.29%w of platinum and 0.53%w of palladium, calculated on the weight of the modified silica spheres.

Preparation of catalyst D'

A quantity of 70 g of pre-dried silica spheres used as starting material under A of Example 1 was impregnated with a solution of 10.95 g of Pt(NH$_3$)$_4$(OH)$_2$ in 1 l of water for 48 hours after which the product was washed with water, dried at 150° C. and subsequently calcined in air at 500° C. for 2 hours. The resultant catalyst (D') contains 0.9% by weight of platinum, calculated on the weight of the silica spheres.

EXAMPLE 3

Catalytic hydrogenation of kerosenes.

Evaluation of the catalysts of Example 2 was based on the results of experiments performed in trickle flow units. The kerosene feed to be hydrogenated, which was entirely or substantially in the liquid phase, was trickled downwardly co-currently with the hydrogen-containing gas through the fixed catalyst beds. The units were equipped with 100 ml reactors operated in once-through mode and contained 15 g of catalyst particles diluted with 50 g of silicium carbide particles with a diameter of 0.2 mm.

Before being used for the catalytic hydrogenation of kerosenes, the catalysts A', B', C' and D' were activated by treatment with hydrogen in the hydroconversion reactor at a temperature of 380° C., a pressure of 30 bar and a hydrogen feed rate of 1200 Nl/kg feed for 16 hours.

After this activation treatment the temperature of the reactor was adjusted to the level required to obtain 80% by volume dearomatization of the kerosene feed (further indicated as: Activity, T$_{80\%}$) with the use of, respectively, catalysts A', B', C' and D'. The results of the experiments are given in the Table hereinafter.

The kerosene used as feed contained 16.1% by volume of aromatic compounds and 12 ppmw of sulfur.

Further hydrogenation reaction conditions were:

| total pressure | 30 bar |
| space velocity | 5.0 g of kerosene/g of catalyst/hour |
| hydrogen feed rate | 400 Nl/kg feed |

The product stream was analyzed by means of refractive index measurements.

TABLE

| Experiment No. | Catalyst | Activity, T$_{80\%}$ (°C.) |
| --- | --- | --- |
| 1 | A' | 288 |
| 2 | B' | 248 |
| 3 | C' | ~280 (unstable) |
| 4 | D' | 307 |

From the results shown it is clear that the modification of silica with tetramethyl ammonium aluminate results in a considerably more active catalyst (B') and C' in comparison with catalysts (A', D') which have not been modified by the process according to the present invention.

What is claimed is:

1. A process for the preparation of modified refractory oxides which comprises: (1) impregnating, via an impregnation solution, a refractory oxide or mixtures thereof, said impregnation solution comprising:
    (i) a solution of a hydrocarbyl ammonium metallate; or
    (ii) two solutions, said first of said two solutions containing a hydrocarbyl ammonium hydroxide and said second of said two solutions containing a compound of a metal selected from the group consisting of a metal of Group IIA, IIIA, IVA, and IVB of the Periodic Table of Elements; and after said impregnation; (2) drying said modified refractory oxide at a temperature of from 50°–250° C.; (3) calcining said dried modified refractory oxide at a temperature of from 250°–1000° C.; and (4) recovering the resultant calcined modified refractory oxide.

2. The process according to claim 1, wherein the refractory oxides are selected from the group consisting of silica, alumina, magnesia, zirconia, titania, chromia, boria or mixtures thereof.

3. The process according to claim 1, wherein the refractory oxide is silica.

4. The process according to claim 1, wherein the refractory oxide is substantially non-crystalline.

5. The process according to claim 3, wherein the silica has a pore volume of at least 0.5 ml/g.

6. The process according to claim 5, wherein the silica particles contain less than 12%w of water, calculated on the total weight of the particles.

7. The process according to claim 1, wherein said refractory oxides comprise particles of which the smallest size is of from 0.1–30 mm.

8. The process according to claim 7, wherein said particles have a diameter of 0.5–10 mm.

9. The process according to claim 7, wherein said particles are substantially spherical.

10. The process according to claim 1, wherein said hydrocarbyl ammonium moiety comprises one or more alkyl groups possessing 1–4 carbon atoms.

11. The process according to claim 10, wherein said hydrocarbyl ammonium moiety comprises a tetramethyl ammonium group.

12. The process according to claim 1, wherein said metal is selected from the group consisting of magnesium, aluminum, titanium, zirconium, and mixtures thereof.

13. Process according to claim 1, wherein refractoy oxides are impregnated with a solution comprising tetramethyl ammonium aluminate.

14. The process according claim 1, wherein said resultant modified refractory oxides comprise 0.1–10%w of metals, calculated as metal oxides and based on the total weight of the modified refractory oxides.

15. A process for the preparation of modified refractory oxides which comprises: (1) impregnating via an impregnation solution, a refractory oxide or mixtures thereof, said impregnation solution comprising:
    (i) a solution of a hydrocarbyl ammonium metallate; or
    (ii) two solutions, said first of said two solutions containing a hydrocarbyl ammonium hydroxide and said second of said two solutions containing a compound of a metal selected from the group consisting of a metal of Group IIA, IIIA, IVA and IVB of the Periodic Table of Elements; and after said impregnation; (2) calcining said impregnated refractory oxide at a temperature of from 250° to 400° C.; (3) again impregnating said impregnated and calcined refractory oxide with a second impregnation solution of a hydrocarbyl ammonium hydroxide; (4) recalcining said impregnated refractory oxide at a temperature of 400°–800° C.; and recovering said modified refractory oxide.

16. The process according to claim 15, wherein refractory oxides are impregnated with a solution comprising the nitrate or nitrates of one or more of the metals and subsequently, after calcination, with a solution of a hydrocarbyl ammonium hydroxide.

17. The process according to claim 16, wherein said hydrocarbyl ammonium hydroxide and refractory oxides are present in a weight ratio of from 0.01 to 1.

18. The process according to claim 15, wherein the first calcination is carried out at temperatures of 250°–400° C. for 1–24 hours, and wherein the second calcination is subsequently carried out at temperatures of 400°–800° C. for 1–24 hours.

* * * * *